United States Patent
Shiang et al.

(10) Patent No.: US 12,348,399 B2
(45) Date of Patent: Jul. 1, 2025

(54) HIGH FREQUENCY PROBING FOR NETWORK BANDWIDTH ESTIMATION USING VIDEO DATA IN REAL-TIME VIDEO CONFERENCE

(71) Applicant: Apple Inc., Cupertino, CA (US)

(72) Inventors: Hsien-Po Shiang, Mountain View, CA (US); Ming Jin, Saratoga, CA (US); Gabriel Nava Marino, Cupertino, CA (US); Gurtej Singh G. Chandok, Sunnyvale, CA (US); Hyeonkuk Jeong, Saratoga, CA (US); Padmavathy Bhooma, Los Gatos, CA (US); Christoph Paasch, Cupertino, CA (US); Christopher M. Garrido, San Jose, CA (US); David L Biderman, Los Gatos, CA (US); Erik Vladimir Ortega Gonzalez, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/314,874

(22) Filed: May 10, 2023

(65) Prior Publication Data
US 2023/0283538 A1   Sep. 7, 2023

Related U.S. Application Data

(62) Division of application No. 17/304,312, filed on Jun. 17, 2021, now Pat. No. 11,652,722.
(Continued)

(51) Int. Cl.
*H04L 43/0894* (2022.01)
*H04L 43/12* (2022.01)
(Continued)

(52) U.S. Cl.
CPC .............. *H04L 43/12* (2013.01); *H04L 43/50* (2013.01); *H04N 7/15* (2013.01)

(58) Field of Classification Search
CPC ..... H04L 43/12; H04L 43/50; H04L 43/0894; H04L 65/80; H04L 65/403; H04N 7/15;
(Continued)

(56) References Cited

U.S. PATENT DOCUMENTS 8,819,512 B1 * 8/2014 Wang ................... H04L 1/08
714/748
10,931,725 B2   2/2021 Garrido et al.
(Continued)

*Primary Examiner* — Glenford J Madamba
*Assistant Examiner* — Hassan A Khan
(74) *Attorney, Agent, or Firm* — BakerHostetler

(57) ABSTRACT

The embodiments described herein can dynamically adjust timing of network bandwidth estimations by adjusting a target frequency for sending probing sequences to one or more receivers of content. The receivers receive these probing sequences from a transmitter and respond to the transmitter with network bandwidth estimations. In one embodiment, the probing sequences can use the content itself to create the probing sequences. The embodiments can be used in video conferencing applications to control how a transmitter of content can adjust transmissions based upon the network bandwidth estimations. In one embodiment, a policy can be used at a transmitter to begin a video transmission with a high frequency target for sending probing sequences (with, e.g., smaller length probing sequences) and transition to a lower frequency target (with, e.g., longer length probing sequences) when network bandwidth deteriorates and then return to the higher frequency target when the network bandwidth improves.

22 Claims, 6 Drawing Sheets

Related U.S. Application Data

(60) Provisional application No. 63/041,549, filed on Jun. 19, 2020.

(51) Int. Cl.
*H04L 43/50* (2022.01)
*H04L 65/403* (2022.01)
*H04L 65/80* (2022.01)
*H04N 7/14* (2006.01)
*H04N 7/15* (2006.01)
*H04N 21/2383* (2011.01)
*H04N 21/24* (2011.01)
*H04N 21/442* (2011.01)

(58) Field of Classification Search
CPC ...... H04N 21/2383; H04N 21/24; H04N 7/14; H04N 21/442
See application file for complete search history.

(56) References Cited

U.S. PATENT DOCUMENTS

| | | | |
|---|---|---|---|
| 11,121,954 B2* | 9/2021 | Vasseur | H04L 43/106 |
| 2004/0243335 A1* | 12/2004 | Gunawardena | H04L 67/1001 |
| | | | 702/116 |
| 2007/0217448 A1* | 9/2007 | Luo | H04L 47/283 |
| | | | 370/468 |
| 2008/0158339 A1* | 7/2008 | Civanlar | H04N 7/152 |
| | | | 348/14.09 |
| 2009/0164657 A1* | 6/2009 | Li | H04L 41/0896 |
| | | | 709/233 |
| 2010/0153574 A1* | 6/2010 | Lee | H04N 21/6377 |
| | | | 709/231 |
| 2011/0149751 A1* | 6/2011 | Li | H04L 41/147 |
| | | | 370/252 |
| 2011/0157298 A1* | 6/2011 | Huang | H04N 7/15 |
| | | | 348/14.08 |
| 2011/0161836 A1* | 6/2011 | Mu | H04N 21/00 |
| | | | 715/756 |
| 2011/0176429 A1* | 7/2011 | Johnsson | H04L 43/0852 |
| | | | 370/241 |
| 2013/0051380 A1* | 2/2013 | Lundgren | H04W 28/22 |
| | | | 370/338 |
| 2014/0052852 A1* | 2/2014 | Dufour | H04L 43/50 |
| | | | 709/224 |
| 2014/0156735 A1* | 6/2014 | Yamasaki | H04L 67/10 |
| | | | 709/203 |
| 2014/0289405 A1* | 9/2014 | Tychon | H04L 43/50 |
| | | | 709/224 |
| 2015/0067137 A1* | 3/2015 | VerSteeg | H04L 41/0896 |
| | | | 709/224 |
| 2015/0074285 A1* | 3/2015 | Gahm | H04L 65/75 |
| | | | 709/231 |
| 2015/0332155 A1* | 11/2015 | Mermoud | G06N 5/048 |
| | | | 706/12 |
| 2015/0334030 A1* | 11/2015 | Vasseur | H04L 47/115 |
| | | | 370/252 |
| 2015/0350604 A1* | 12/2015 | Roy | H04L 65/00 |
| | | | 348/14.09 |
| 2016/0112673 A1* | 4/2016 | Feng | H04L 65/403 |
| | | | 348/14.08 |
| 2016/0241410 A1* | 8/2016 | Lemoine | H04L 12/1877 |
| 2016/0344608 A1* | 11/2016 | Siemens | H04L 41/0896 |
| 2017/0078180 A1* | 3/2017 | Hagh | H04L 43/50 |
| 2017/0093670 A1* | 3/2017 | Dinan | H04L 67/1004 |
| 2017/0251246 A1* | 8/2017 | Hua | H04N 21/632 |
| 2018/0152384 A1* | 5/2018 | Kakadia | H04L 43/026 |
| 2018/0212798 A1* | 7/2018 | Shang | H04L 43/12 |
| 2018/0338338 A1* | 11/2018 | Baillargeon | H04L 43/12 |
| 2019/0104163 A1* | 4/2019 | Garrido | H04L 65/1089 |
| 2019/0104426 A1* | 4/2019 | Singhal | H04L 12/4633 |
| 2019/0379591 A1* | 12/2019 | Boughzala | H04L 47/115 |
| 2020/0052997 A1* | 2/2020 | Ramanathan | H04L 47/286 |
| 2020/0273268 A1* | 8/2020 | Bhattacharyya | G06Q 10/06315 |
| 2021/0168088 A1* | 6/2021 | Momchilov | H04L 65/1033 |
| 2021/0226879 A1* | 7/2021 | Indiresan | H04L 43/10 |
| 2021/0367878 A1* | 11/2021 | Ramanathan | H04W 4/06 |
| 2021/0385148 A1* | 12/2021 | Nainar | H04L 43/20 |
| 2021/0399971 A1 | 12/2021 | Shiang | |
| 2022/0006717 A1* | 1/2022 | Yu | H04L 43/0876 |

\* cited by examiner

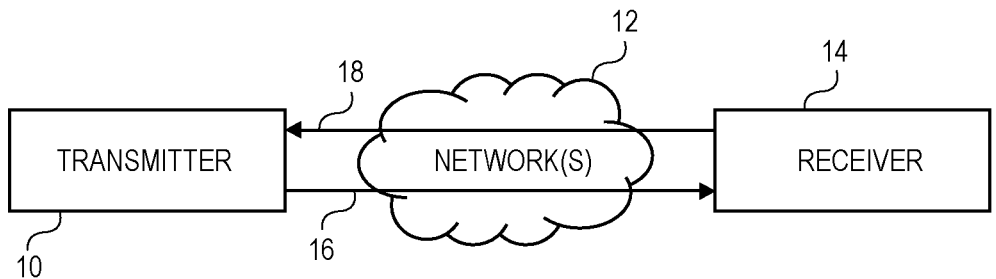
FIG. 1
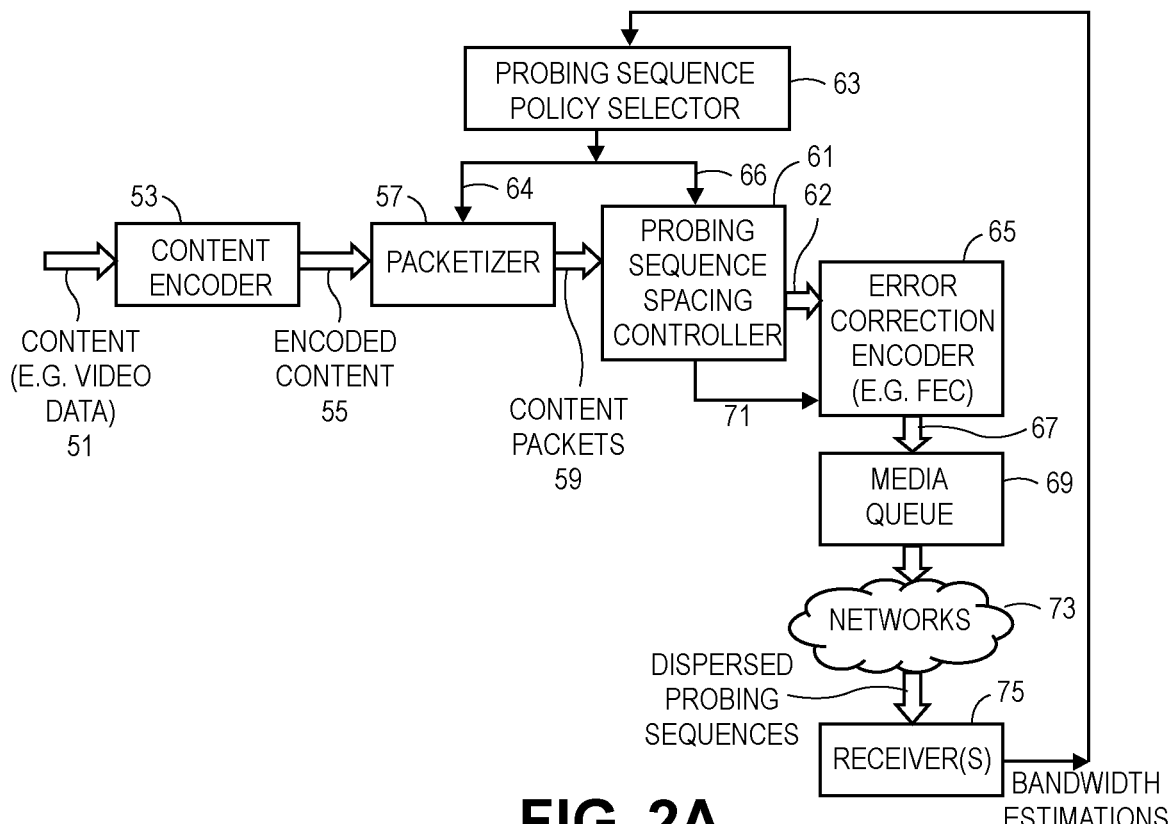
FIG. 2A
FIG. 2B

HIGH FREQUENCY PROBING FOR NETWORK BANDWIDTH ESTIMATION USING VIDEO DATA IN REAL-TIME VIDEO CONFERENCE

This application is a divisional of and claims the benefit of U.S. patent application Ser. No. 17/304,312, filed on Jun. 17, 2021, which claims the benefit of U.S. Provisional Application No. 63/041,549 filed on Jun. 19, 2020, which are incorporated herein by reference.

BACKGROUND

This description relates to methods and systems for estimating a current bandwidth of one or more networks that are used to deliver content, such as video content, to one or more receivers that consume the content or otherwise use the content.

Currently, a transmitter of content and the receiver of the content use an approach that uses probing sequences to estimate the current bandwidth of the network(s) used to deliver the content from the transmitter to the receiver. These probing sequences are often formed in the transmitter as data that is separate from the actual content (such as video) that is displayed or otherwise presented on the receiver. Thus, these probing sequences are added into the stream of packets sent through the network to the receiver, and these probing sequences are sent, at low frequency, from the transmitter along with the packets of content such as video and audio content. The low frequency of the probing sequences will reduce the impact of the probing sequences on the bandwidth of the network. The receiver processes the content and presents the content (e.g., a movie or a FaceTime video conference content) and occasionally processes the probing sequences to generate estimates of the current network bandwidth. As is known in the art, the receiver determines the dispersion in time of the received packets within a probing sequence to estimate a current network bandwidth. The receiver then provides the estimate back to the transmitter so that the transmitter can adjust the transmission of content to the receiver (e.g., by decreasing the amount of data transmitted if network bandwidth has deteriorated because the network has become overloaded with data being transmitted). The transmitter sends the probing sequences with a low frequency (i.e., infrequently) in order to avoid overloading the network with too much data to convey to the various devices connected to the network, including the receiver; these probing sequences use a large set of data packets to provide a reliable measure of network bandwidth at the low frequency of probing.

SUMMARY OF THE DESCRIPTION

The aspects and embodiments described herein can use probing sequences that are sent at different target frequencies over time, and these target frequencies can be varied based upon current network bandwidth and a policy that maps bandwidth estimations received from a receiver to a particular target frequency that can be specified by a target probe spacing time. Thus, the embodiments described herein can dynamically adjust timing of network bandwidth estimations by adjusting a target frequency for sending probing sequences to one or more receivers of content. The aspects and embodiments described herein can use the content itself to form the probing sequences that are sent based upon a target probe spacing time that is associated with a target frequency. In one embodiment, a transmitter can begin a transmission of content at a high target frequency such that probing sequences are sent frequently (e.g., as frequently as a display frame rate such as 30 frames per second, and thus a target probe spacing time at this frequency can be about 33 milliseconds). In one embodiment, the estimation can include a bandwidth value (in, for example, megabits per second) and a network stability value that can be based on a statistical measure (e.g., a standard deviation) of bandwidth values over a period of time. After receiving bandwidth estimates that indicate that the network is becoming congested and the data transmission has slowed, the transmitter can reduce the data transmission rate for the content and also decrease the target probing frequency to a lower rate (which is less than the initial high target frequency). For example, in one embodiment, a policy can be used at a transmitter to begin a video transmission with a high frequency target for sending probing sequences (with, e.g., smaller length probing sequences) and transition to a lower frequency target (with, e.g., longer length probing sequences) when network bandwidth stability deteriorates and then return to the higher frequency target when the network bandwidth stability improves.

A method according to one embodiment can include the following operations performed by a transmitter that is transmitting content (e.g., video with audio), through one or more networks, to one or more receivers: receiving, from one of the receivers, a first estimation representative of network bandwidth; selecting, based on the first estimation, a first probing sequence frequency; receiving, from one of the receivers, a second estimation representative of network bandwidth, the second estimation received after the first estimation was received; selecting, based on the second estimation, a second probing sequence frequency that is different than the first probing sequence frequency. The method in one embodiment can further include the operations of: transmitting one or more first probing sequences at a frequency based on a target of the first probing sequence frequency prior to receiving the second estimation; and transmitting one or more second probing sequences at a frequency based on a target of the second probing sequence frequency after receiving the second estimation. In one embodiment, each of the one or more first probing sequences can include a marker indicating packets in the probing sequence are part of the same probing sequence to cause a receiver to estimate and report bandwidth estimation.

In one embodiment, a method can use a probing sequence that is created from the content that is to be presented (e.g., displayed) at the receiver. In one embodiment, the probing sequences can be created by packetizing content into the packets and adding the marker in one or more headers, and wherein the content is displayed at the receiver. In one embodiment, the first probing sequence frequency can be associated with a first target spacing time and a first target probing sequence length and the second probing sequence frequency can be associated with a second target spacing time and a second target probing sequence length. In other words, when the probing system is operating with a target probing frequency based on the first probing sequence frequency, the transmitter attempts to send probing sequences with a target length of about the first target probing sequence length and attempts to send them once per first target spacing time (e. g., if the target spacing time is 33 milliseconds, then the transmitter attempts to send a probing sequence once every 33 milliseconds). When the probing system is operating with a target probing frequency based on the second probing sequence frequency, the transmitter attempts to send probing sequences with a target length of about the second target probing sequence length and attempts to send them once per second target spacing time (e. g., if the target spacing time is 100 milliseconds, then the transmitter attempts to send a probing sequence once every 100 milliseconds). In this example the first probing sequence frequency is a high frequency relative to the second probing sequence frequency. In one embodiment, the first probing sequence frequency can be, for example, as high as a display frame rate (such as 30 frames per second).

In one embodiment, a selection of a probing sequence frequency can be performed through the use of a stored policy that maps estimation values received from the receiver to probing sequence frequencies (or to target probe spacing times). For example, a high bandwidth estimate (indicating the network is operating with a steady high bandwidth of, for example, 20 megabits per second) may be mapped to the highest probing sequence frequency supported by the transmitter, such as 30 probe sequences per second. A low bandwidth estimate (indicating the network is operating with a low bandwidth of, for example, dynamically varying less than 1 megabits per second) may be mapped to the lowest probing sequence frequency supported by the transmitter, such as 1 probe sequence per second or even 1 probe sequences per 2 seconds. In one embodiment, the stored policy can be configured to start a video transmission at a high probing sequence frequency and reduce to a low probing sequence frequency as network bandwidth stability deteriorates and then return to the high probing sequence frequency as network bandwidth stability improves. In this case, the transmitter can default to the highest probing sequence frequency permitted by the current network bandwidth and can begin transmission (when the video session begins) with the highest probing sequence frequency and then dynamically adjust the probing frequency based on the current estimated network bandwidth. In one embodiment, the stored policy can include a maximum probe spacing time that is used to ensure that a probe sequence is transmitted in the event of an insufficient amount of qualified video content for probing sequences when the content itself is used to create the probing sequences.

In one embodiment, the method can also include the operation of: adjusting a rate of transmission of data to the one or more receivers based on the first estimation (of network bandwidth) during a first time period and adjusting the rate of transmission based on the second estimation during a second time period.

Another aspect of the embodiments described herein involves a transmitter that can force the insertion of probing sequences when probing sequences of a desired size and desired number of packets cannot be adequately assembled from packets of the content after a period of time (e.g., a maximum probe spacing time) in which no probing sequences have been sent. These aspects relate to embodiments which use the content to create the probing sequences (rather than creating separate data that is not part of the display content and using that separate data as the probing sequences). In some cases, the content may have minimal data for a period of time; for example, in the case of a video conference, there are times when the content is minimal (e.g., no one is in front of the cameras in the video conference and the scene in front of both cameras is static, so there is likely very minimal content that is transmitted with modern encoding techniques). When this occurs, some embodiments described herein can create additional data to be added to the content to create probing sequences from the combination of the additional data and the content. In one embodiment, the transmitter uses a maximum probe spacing time to determine whether to force the insertion of a fabricated probing sequence when the content available during the maximum probe spacing time has been inadequate for use as a probing sequence. A method according to this aspect can include the following operations: packetizing content to be transmitted to one or more receivers; determining whether a lapsed time since a most recent probing sequence was transmitted to the one or more receivers exceeds a predetermined time (e.g., a maximum probe spacing time); and creating additional content to add to the content in response to determining the lapsed time exceeds the predetermined time; and then sending the combination (content and additional content) as a probing sequence. In one embodiment, the additional content comprises error correction codes added to ensure the content has a sufficient size for use as a probing sequence and wherein the predetermined time is a maximum probe spacing time. In one embodiment, the method can also include the operation of: monitoring whether content to be transmitted provides an adequate probing sequence for use in estimations that represent network bandwidth, wherein the monitoring compares the content to parameters that include a minimum probe size and a minimum number of packets for a probing sequence.

Another aspect of the embodiments described herein involves receiver devices that respond to the different probing sequences at the different probing frequencies. In one embodiment, a method performed by a receiver can include the following operations: detecting a first set of packets are part of a first probing sequence based on a marker in each packet in the first set of packets, the first probing sequence sent from the transmitter based on a first probing sequence frequency; responding to the transmitter with a first estimation of network bandwidth based on time of receipt of packets in the first set of packets; detecting a second set of packets are part of a second probing sequence based on a marker in each packet in the second set of packets, the second probing sequence sent from the transmitter based on a second probing sequence frequency; responding to the transmitter with a second estimation of network bandwidth based on time of receipt of packets in the second set of packets.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 1 shows an example of a system that includes a transmitter (e.g., a computer system) that transmits content (e.g., video and audio) to at least one receiver through one or more networks (e.g., the internet) and receives network bandwidth estimates from the receiver.

FIG. 2A shows an example of components within a transmitter that is transmitting content to a receiver.

FIG. 2B shows an example of a probing policy that maps bandwidth estimations to desired or target parameters for probing sequences.

DETAILED DESCRIPTION

Figure 3A:
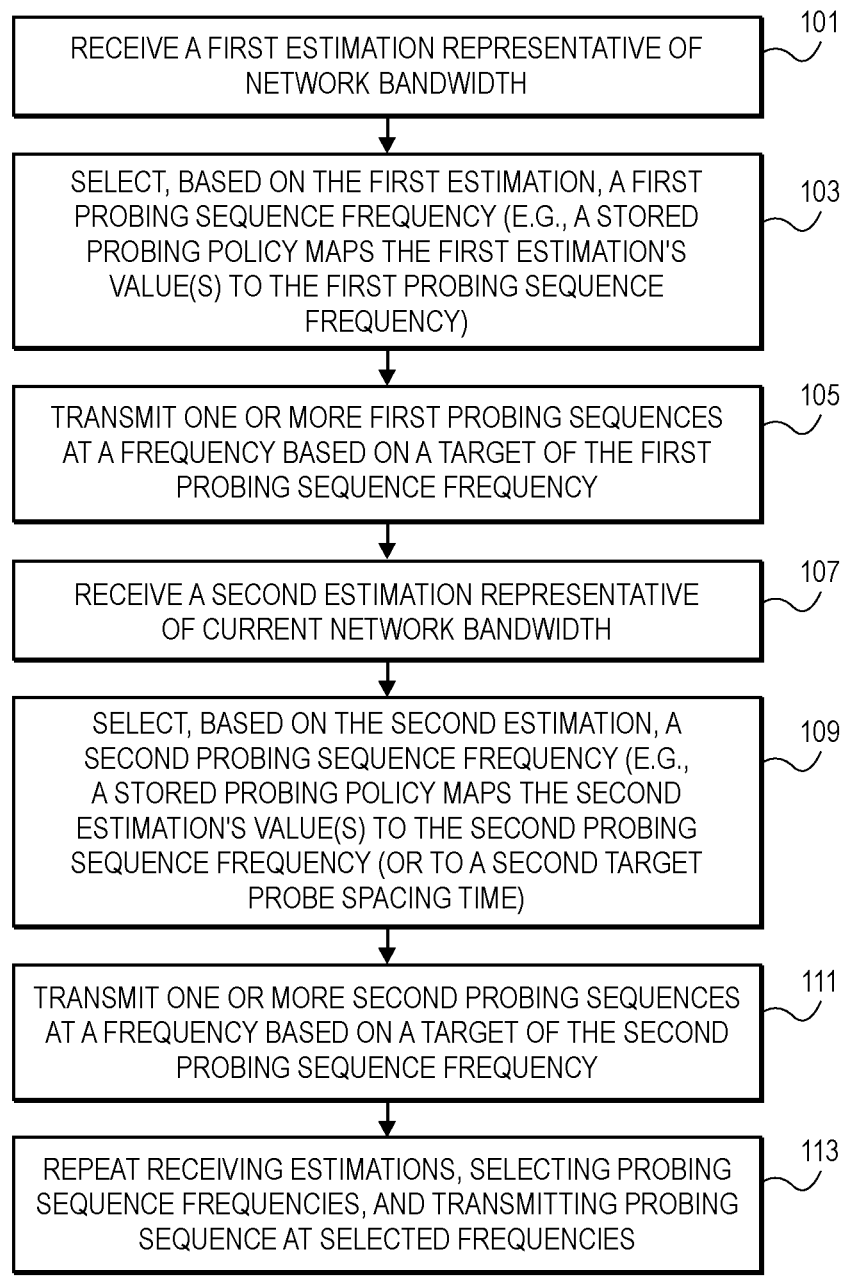
FIG. 3A is a flowchart that shows a method according to one embodiment that can be used in a transmitter to dynamically adjust probing frequency for sending probing sequences.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Network bandwidth estimation (BWE) is an important part of how video transmission systems manage the presentation of content such as a real time video conference. Network bandwidth estimation is used to adjust the rate of transmission of content, such as real time video content for a real-time video conference system, to adapt the video traffic to the current bandwidth state of the network which can change over time as the amount of data transmitted through the network changes. For example, when the bandwidth is suddenly reduced, a transmitter should reduce its transmission rate promptly to avoid unnecessary network congestion so that the content, such as video, can be displayed smoothly on a receiver. The reduction (or increase) of a transmission rate is well known in the art and can include changes in the resolution or frame rate of the content. On the other hand, if the bandwidth limitation is removed, the transmitter should rapidly adjust its transmission sending rate to resume providing content at a higher rate such as a higher quality of video content (e.g., a higher resolution of video content). The process of obtaining network bandwidth estimations is done by a transmitter sending some probing packets to the receiver to probe the network capacity. Such probing packets are often referred to as probing sequences. Normally, the probing sequences are long and infrequent over time in order to accurately estimate the network capacity without introducing too much probing overhead that could adversely affect the content being transmitted through the network. However, such low frequency probing often makes the rate adaptation not responsive enough, and the transmitter could already be sending excessive content, such as video data, that congests the network.

FIG. 1 shows an example of a system in which bandwidth estimation can be performed. The system shown in FIG. 1 includes a transmitter 10 which transmits content, along with probing sequences, through a connection 16 to a receiver 14 which can process and display the content. The receiver uses the probing sequences to measure an estimate of the bandwidth of the network 12 which can be one or more networks such as the Internet. Once the receiver has measured a current bandwidth of the network 12, the receiver can provide this estimation of the network bandwidth through the connection 18 back to the transmitter 10. If the receiver 14 also functions as a transmitter (such as when the transmitter 10 and the receiver 14 are in a two-way video conference, such as a FaceTime videoconference which is an example of a real-time videoconference between two devices), then the receiver 14 sends content to the transmitter 10 and also sends probing sequences to the transmitter 10. The various embodiments described herein can be used in a system such as that shown in FIG. 1, and the system can include multiple receivers and multiple transmitters in one embodiment.

FIG. 2A shows an example of a system which includes a transmitter and one or more receivers; in this system, the transmitter transmits content through one or more networks, such as one or more networks 73, to a receiver 75 (or a set of receivers). The transmitter shown in FIG. 2A also transmits probing sequences using one of the embodiments described herein, and the receiver 75 uses the probing sequences to measure network bandwidth, and provides bandwidth estimations 77 of the network bandwidth back to the transmitter. In the example shown in FIG. 2A, the transmitter includes a plurality of components that can operate, in one embodiment, with a probing sequence policy selector, such as the probing sequence policy selector 63. The plurality of components of the transmitter shown in FIG. 2A are: a content encoder 53, a packetizer 57, a probing sequence spacing controller 61, a probing sequence policy selector 63, an error correction encoder 65, and a media queue 69. The transmitter can receive content 51, which can be video data (such as video data generated by a camera which captures images of a user or other images). The content 51 can be provided to a content encoder 53 which can use conventional, known techniques to encode the content in any one of a variety of formats for transmission in packets. The encoded content 55 from the content encoder 53 is provided to a packetizer 57. The packetizer 57 can use known techniques in the art to create packets containing the encoded content 55, which packets will be transmitted through the one or more networks 73 to the receiver 75.

Data regarding the packets created by packetizer 57 can be provided to a probing sequence spacing controller 61 which can, as described further below, monitor the quality of the packets 59 produced by the packetizer 57; in particular, the probing sequence spacing controller 61 can monitor whether the content packets 59 are adequate for the purpose of providing probing sequences at least in those embodiments in which the probing sequences are formed from the content itself rather than separate data. The content packets 59, at the input 62, can then be processed in an error correction encoder 65 which in one embodiment can be a forward error correction (FEC) encoder that can generate error correction codes that can be included with the packets 59. In one embodiment, the error correction encoder 65 can use techniques known in the art to generate and introduce error correction codes into the packetized stream for transmission through the networks 73 to the receiver 75. In addition, as described further below, the FEC encoder 65 can create additional data that is added to the content 51 to create a set of content that is adequate for use as a probing sequence; this aspect of the FEC encoder can be turned on or off based on the state of the output 71 from the probing sequence spacing controller 61. The output 67 from the error correction encoder can be provided to a media queue 69 which can be a buffer used by the transmitter to transmit the packets. In one embodiment, the media queue 69 may contain a full set of packets within a probing sequence such that the full set of packets can be transmitted in a burst mode from the transmitter through the one or more networks 73 to the receiver 75; thus, in one embodiment, all of the packets in a probing sequence are transmitted in a burst mode so their transmission is almost at the same time. This use of burst mode transmissions is known in the art. As the packets in the probing sequence are transmitted through the one or more networks 73, they tend to become dispersed in time, and the receiver 75 can use the dispersed probing sequences to measure an estimate of the network bandwidth as is known in the art.

The result of those measurements can then be provided as bandwidth estimations 77 back to the transmitter, which bandwidth estimations 77 are received in one embodiment by the probing sequence policy selector 63. These bandwidth estimations 77 can be provided using techniques known in the art, such as a feedback channel (e.g., RTCP) or piggybacked with the reverse video or audio traffic using an RTP extension. The probing sequence policy selector 63, as described further below, can use one or more stored policies to dynamically control probing sequence frequency selection based upon the bandwidth estimates that are received by the selector 63. For example, the stored policies can map various different values of bandwidth estimates to different probing sequence frequencies (or corresponding different target probe spacing times) in order to dynamically adjust the probing frequency of the transmitter based upon the bandwidth estimates. An output 62 from the probing sequence policy selector 63 can be provided to the packetizer 57, and the output 66 from the probing sequence policy selector 63 can be provided to the probing sequence spacing controller 61. These outputs can control the processing operations of the packetizer 57 and the probing sequence spacing controller 61 to achieve the desired probing sequence frequency that has been selected by the probing sequence policy selector 63. The probing sequence spacing controller 61 can be used as described further below to initiate marking of incoming packets with a specific identifier, such as a group identifier, to form a probing sequence. The probing sequence spacing controller 61 an determine whether or not to mark a set of packets as a probing sequence based upon criteria in a selected policy. In one embodiment, the policy can specify criteria, such as criteria concerning the size of the frame or other set of data, which may be required to be at least a minimum probe size, and also a target probe spacing time and also other criteria (described below) depending on the embodiment.

In one embodiment, the transmitter shown in FIG. 2A can be configured by a set of policies to provide very frequent probing sequences at least when the estimated network bandwidth is high and stable, and this can enable a fast reaction time by the transmitter. In this embodiment, the transmitter aims to provide very frequent probing sequences to enable fast reaction time whenever possible. In one embodiment, in order not to congest the video traffic (or other types of traffic), the embodiment can use the content itself, such as the video packets, to generate probe sequences without introducing any additional probing traffic to probe the network. In other words, the embodiment can make use of each video frame itself as the probing sequence, and the video frame can be packetized into an appropriate number of packets to form the probing sequence. In a most extreme case, all video frames themselves could serve as the probing sequences as long as they are transmitted appropriately; for example, in the case of video which is at a frame rate of 30 frames per second, the probing sequence could be as frequent as every 33 milliseconds. However, there is no guarantee that an arbitrary video frame could have an adequate size to qualify as a valid probing sequence. Depending on the bandwidth capacity, this embodiment attempts to have a probing sequence last for a certain amount of transmission time. In the case of video which has very little content (such as when the image in the frame does not change over time for a prolonged period of time), the embodiment can allow relaxing the probing sequence spacing up to a maximum probe spacing time as long as the overall probing sequence spacing is kept around a target probe spacing time. If after waiting for the maximum probe spacing time there are still no video frames that are large enough to provide adequate probing sequences then, the embodiment can enforce a current frame as a probing sequence and enlarge the probing sequence to an adequate size by adding additional data, such as additional error correction codes (e.g., FEC) on the current frame to make the overall probing sequence large enough. The frequency of the probing sequence can be controlled dynamically based upon the parameters in a set of policies, which parameters can include a maximum probe spacing time and a target probe spacing time. The selected policy can be changed based on the currently detected network bandwidth estimate and its stability metrics or statistics. In one embodiment, the selected policy can be based upon a standard deviation measurement provided by the receiver of the network bandwidth estimate as the network bandwidth estimate changes over time. In other words, a standard deviation of a set of values of estimated network bandwidth over time can be provided by the receiver to the transmitter, and the transmitter can use the standard deviation to select the appropriate policy from a set of policies that control the dynamic adjustment of the probing sequence frequency. In one embodiment, the lowest values of the standard deviation (indicating a stable network bandwidth) map to the highest probing frequencies and the highest values of the standard deviation (indicating an unstable network bandwidth) map to the lowest probing frequencies. The set of policies can enumerate several possible parameter sets, and in one embodiment, the transmitter can start with the policy with the highest probing frequency and stay there if the network bandwidth estimates remain stable (e.g., lowest range of standard deviation values) and the network bandwidth estimates are adequately high. As the stability metrics get worse (e.g., the standard deviation values get larger), the transmitter can then select the next policy with a lower frequency and a larger probing sequence to ensure the accuracy of the estimation. FIG. 2B shows an example of such a set of policies; each policy that can be selected from the set of policies includes a set of parameters that govern the selected policy.

In the example shown in FIG. 2B, a probing sequence policy selector, such as the probing sequence policy selector 63, can select one of the policies in the set of policies based upon the current network bandwidth estimation. In particular, a policy selector can compare the current network bandwidth estimation to one of the three possible ranges of network bandwidth stability 85 shown in FIG. 2B and select one of the policies (along a row of the table shown in FIG. 2B) based upon the match between the current network bandwidth estimation to one of the three ranges. In the example shown in FIG. 2B, there are three possible ranges (highest, medium, and lowest), but in alternative embodiments, there can be more ranges to allow greater diversity in possible probing sequence frequencies. The highest range for network bandwidth stability represents a network which is operating near its optimum capacity while the lowest range for the network bandwidth represents a network which is operating very poorly and unstably due to congestion of data in the network. If the network bandwidth estimate is in the highest range, then the highest probing sequence frequency 87 is selected, and that selected policy specifies the shortest size of the target probe size 89 and also specifies a maximum probe spacing time 91. In one embodiment, the maximum probe spacing time can be a few seconds, such as two seconds. If the network bandwidth estimate is in the middle range, then the medium probing sequence frequency 87 is selected, and that selected policy specifies a medium size of the target probe size 89 and also specifies the same maximum probe spacing time (for example, two seconds). If the network bandwidth estimate is in the lowest range (e.g., the range with the largest standard deviation values in one embodiment), then the lowest probing sequence frequency 87 is selected with the longest size for the target probe size 89 and the same maximum probe spacing time (for example, two seconds). In one embodiment, the highest probing sequence frequency can be 30 probes per second, and the lowest probing sequence frequency can be one probe per second. In an alternative embodiment, a target probe spacing time may be used instead of the probing sequence frequency values 87 shown in FIG. 2B; each target probe spacing time is related to its corresponding probing sequence frequency value. For example, if the probing sequence frequency value is 30 probes per second then the corresponding target probe spacing time is 33 milliseconds due to the relationship between the frequency and the spacing time (e.g., a probing sequence frequency of 30 probes in 1000 milliseconds are spaced apart in time by about 33 milliseconds). The smaller the target probe spacing time, the higher the probing sequence frequency is. In one embodiment, the target probe size 89 may be specified as a minimum probe size. In the example shown in FIG. 2B, the target probe size is inversely related to the probing sequence frequency; the higher the probing frequency the shorter the length of the target probe size. In an alternative embodiment, the target probe size 89 can be determined based on the network bandwidth value in bits per second (e.g., 10 MB per second) rather than from the network bandwidth stability value (e.g., a standard deviation of the bits per second). In other embodiments, the set of policies can also include other probing sequence parameters such as minimum number of probing packets. In one embodiment, the policy selector (for example, the probing sequence policy selector 63 in FIG. 2A) can start a transmission session with a selected policy that is at the highest probing frequency and then dynamically adjust the policy when the bandwidth estimation gets worse (e.g., a stability measure, such as a standard deviation, gets worse by getting larger), and the policy selector attempts to return back to the highest probing frequency when network conditions allow the return back to the highest probing frequency.

In one embodiment, a set of policies can include data about a minimum number of probing packets, and a packetizer, such as the packetizer 57 shown in FIG. 2A, can use such information from the selected policy from the output 64. For example, given such information, a packetizer in one embodiment would know at least how many packets to packetize an encoded video frame so that the probing sequences can be formed on a per frame basis. A packetizer can also ensure that the packets are under the maximum transmission unit (MTU) limitation for particular network protocol, and hence it can be appropriate to packetize a frame into a number larger than the minimum number of probing packets. In one embodiment, a transmitter can perform this packetization before a set of packets are marked as part of a probing sequence so that, given a certain encoding bit rate, the packet rate is fixed regardless of whether a set of packets is marked or not marked as a probing sequence. In one embodiment, a probing sequence spacing controller, such as the probing sequence spacing controller 61, can mark the incoming packets of a frame with a specific group identifier to form a probing sequence. In one embodiment, the controller 61 can decide whether or not to mark based upon the satisfaction of both of the following criteria (1) the size of the frame must be at least the minimum probe size and (2) the time since the last marked probing sequence is at least the target probe spacing time. Note that in the lower bandwidth cases, rate adaptation by the transmitter (in which the transmitter reduces the rate of transmission of content) would likely suggest a low encoding rate, and the resulting video frame rate may drop dramatically. Hence, it is possible in such low frame rate scenarios, that the time between probing sequences becomes the video frame interval which is larger than the target probe spacing time over a period of time, but this is considered a normal behavior. In one embodiment, the media queue, such as media queue 69 should ensure that the packets are marked with the same group identifier, which specifies the same probing sequence, to be sent out in one burst. In one embodiment, when video traffic is being used, the probing group identifier could be the video RTP timestamp in the RTP packet header. In one embodiment, the media queue can put a one bit probing marker into an RTP extension so that the receiver can identify each probing sequence from the RTP timestamp and this one bit marker to estimate bandwidth over the network. The one bit probing marking identifies the packet as being part of a probing sequence; the combination of the RTP timestamp (which can be the same across all of the packets sent in a burst) and the one bit marker can indicate which packets are part of a probing sequence to allow a receiver to collect the data needed to compute the bandwidth estimates, such as bits per second and standard deviations of the measured bits per seconds.

In one embodiment, a transmitter (e.g., the transmitter shown in FIG. 2A) can use the method shown in FIG. 3A to dynamically adjust probing frequency over time based upon measured bandwidth estimates from one or more receivers. In operation 101, a transmitter can receive a first estimation which is representative of network bandwidth. This first estimation can include a bandwidth estimation value along with a network stability value, such as a standard deviation of network bandwidth estimates over a period of time. In operation 103, the transmitter can select, based upon the first estimation, a first probing sequence frequency. For example, the transmitter can use a stored probing policy which maps the first estimation's value (or set of values) to the first probing sequence frequency. FIG. 2B shows an example of a stored probing policy which performs this mapping. Then in operation 105, the transmitter can transmit one or more first probing sequences at a frequency based on a target of the first probing sequence frequency. In one embodiment, the transmitter can use actual content that is presented, such as video content, to form the probing sequences, rather than adding additional data that is used as the probing sequences. In operation 107, the transmitter can receive a second estimation which represents the current network bandwidth. This second estimation can come after the first estimation and represents the current network bandwidth that exists after the first estimation. Then in operation 109, the transmitter can select, based on the second estimation, a second probing sequence frequency from a stored set of policies. For example, a stored policy can map the second estimation's value(s) to a second probing sequence frequency. As a result of operation 109, the transmitter can transmit, in operation 111, one or more second probing sequences at a frequency based on a target of the second probing sequence frequency. Then in operation 113, the transmitter can repeat the process of receiving estimations and selecting probing sequence frequencies and transmitting probing sequences at those selected frequencies. The method in FIG. 3A can use content to form the probing sequences. Moreover, the method shown in FIG. 3A can transmit content such as video and audio as part of the probing sequences and can change the transmission rate based upon the network bandwidth estimations as is known in the art; another words, when the network bandwidth estimations deteriorate indicating that the network is becoming congested, the transmitter can reduce the amount of data which is transmitted in order to reduce the congestion of data on the network.

Figure 3B:
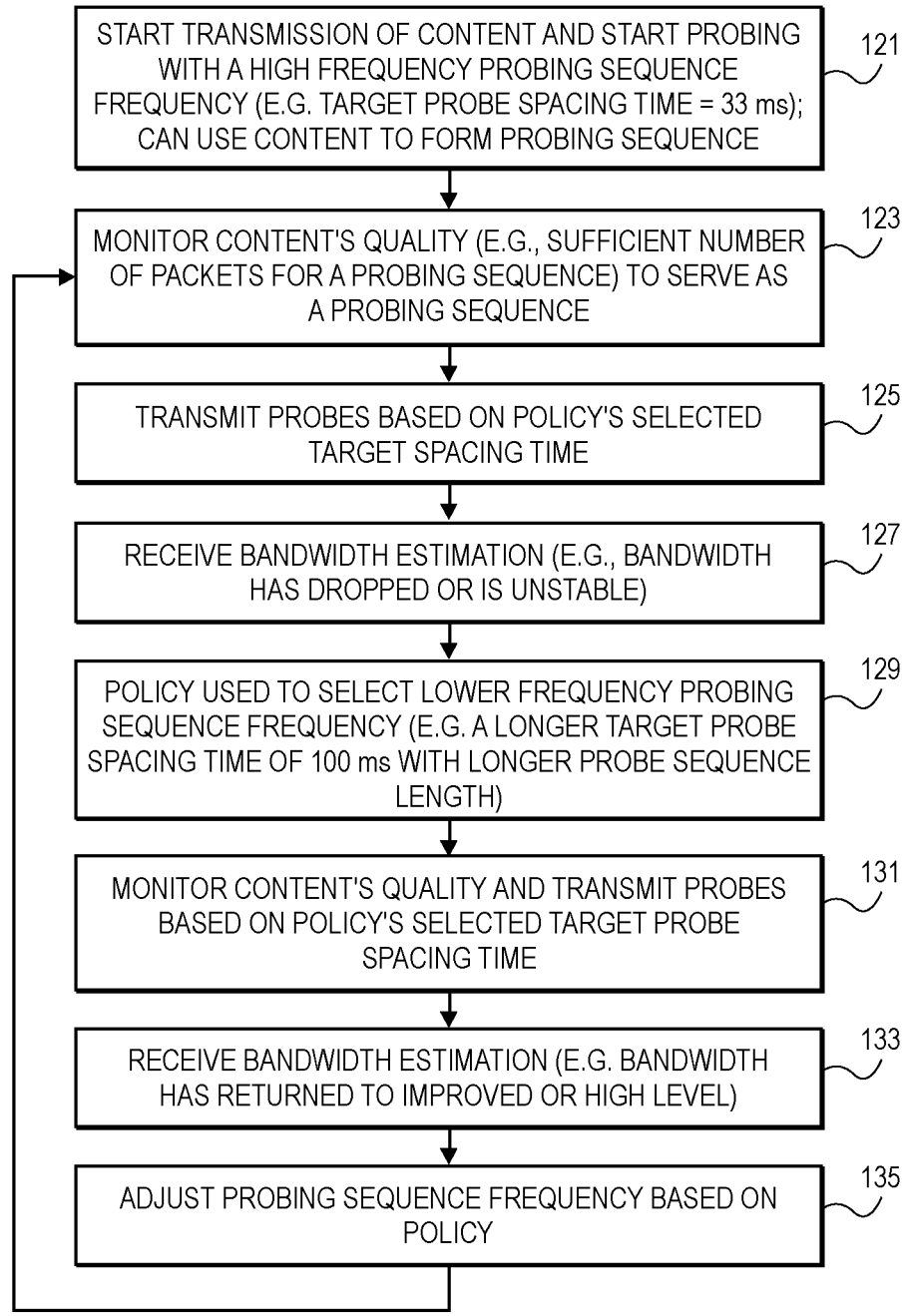
FIG. 3B is a flowchart that shows a method according to an embodiment that uses a policy to determine how to dynamically adjust probing sequence frequency during transmission of content from a transmitter.

FIG. 3B shows another example of another embodiment which can be used by a transmitter (e.g., the transmitter shown in FIG. 2A) that attempts to use a highest frequency probing sequence. In operation 121, the transmitter can start transmission of content in a video session and can start probing with a high frequency probing sequence; in one embodiment the high-frequency probing sequence can use content to form the probing sequences rather than using separate independent data as the probing sequences. Then in operation 123, the transmitter can monitor the content's quality that is being received from the encoder, such as the content encoder 53. The system can monitor the quality to determine whether it is sufficient to serve as a probing sequence. For example, criteria specified in the policy, such as the policy shown in FIG. 2B can be used to determine whether there are a sufficient number of packets for a probing sequence. The transmitter in operation 125 can transmit probes based on the policy's target probe spacing time. For example, if the target probe spacing time is 33 milliseconds, then the transmitter can attempt to transmit probes based on that selected target probe spacing time. In operation 127, the transmitter can receive another bandwidth estimation. In this example, the bandwidth estimation may indicate that the bandwidth has decreased or the network bandwidth has become unstable based upon, for example, a standard deviation measurement of the bandwidth estimation. In operation 129, the transmitter can use the policy to select a lower frequency probing sequence frequency as a result of the indication of the bandwidth having dropped or becoming unstable. For example, the policy selector can select a policy with a longer target probe spacing time and a longer target probe sequence length. In operation 131, the transmitter can monitor the content's quality and transmit probes based on the policy's selected target probe spacing time. In operation 131, the transmitter can receive bandwidth estimations. For example, the transmitter can receive bandwidth estimations which indicate that the bandwidth has returned to improved levels or to the highest level. As a result, in operation 135, the transmitter can adjust the probing sequence frequency based on the stored policy, and this process can repeat by returning to operation 123 as shown in FIG. 3B.

Figure 4:
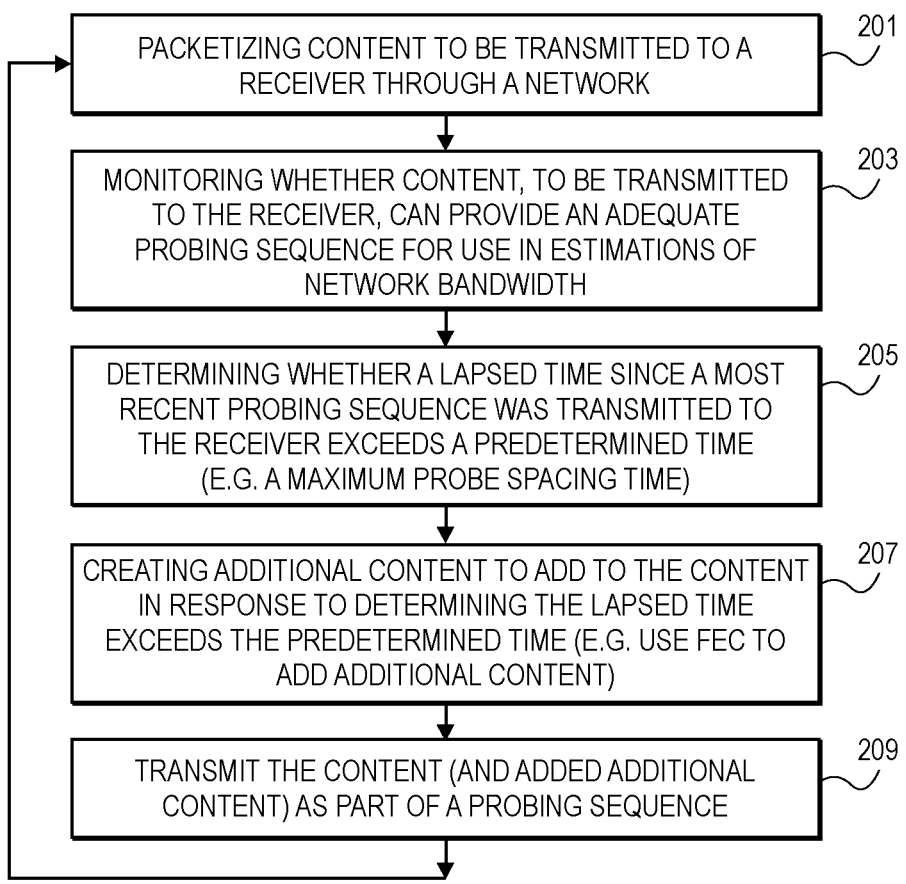
FIG. 4 is a flowchart that shows a method according to an embodiment in a transmitter that can force the insertion of a probing sequence.

As described above, a transmitter in one embodiment can enforce the creation of probing sequences when the content itself is being used to create the probing sequences but is insufficient or inadequate to generate adequate probing sequences. The method shown in FIG. 4 shows an example of an embodiment that enforces the creation of probing sequences when the content itself is insufficient or inadequate to generate adequate probing sequences. In operation 201, a transmitter (e.g., the transmitter shown in FIG. 2A) can packetize content to be transmitted to a receiver through a network. In operation 203, the transmitter can monitor whether the content, to be transmitted to the receiver, can provide an adequate probing sequence for use in estimations of network bandwidth. In operation 205, receiver can determine whether a lapsed time since a most recent probing sequence was transmitted to the receiver exceeds a predetermined time, such as a maximum probe spacing time. If the lapsed time exceeds the predetermined time, then the transmitter can create additional content to add to the content in operation 207; for example, the FEC encoder 65 can be used to create and add the additional content into the stream of packets within a probing sequence to ensure that the probing sequence has an adequate size as required by the currently selected policy. Then in operation 209, the transmitter can transmit the content and the additional added content as part of the probing sequence, and the process shown in FIG. 4 can repeat by reverting back to operation 201.

Figure 5:
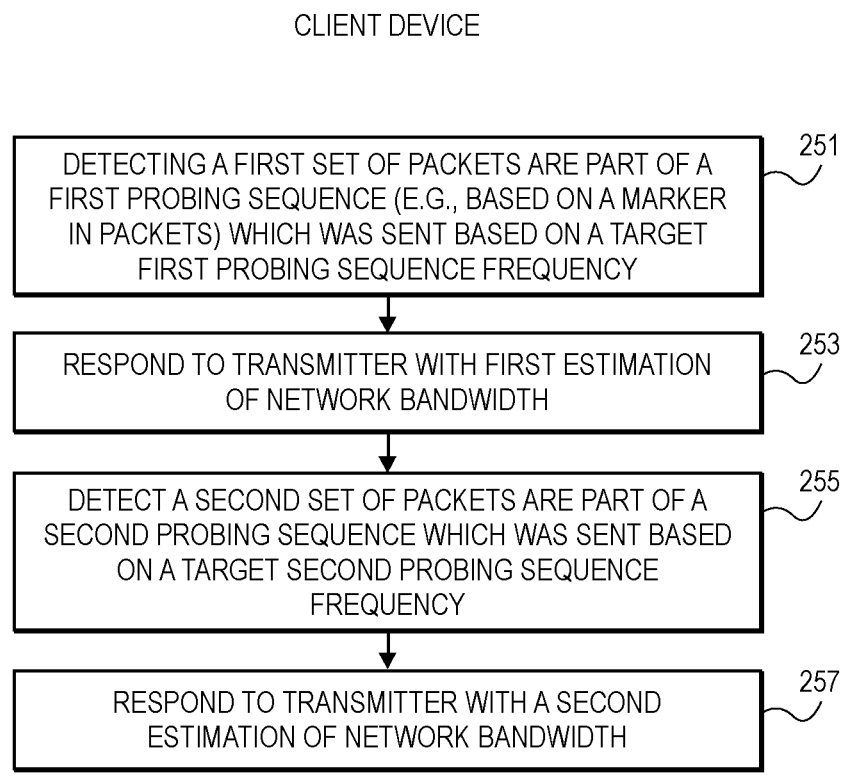
FIG. 5 shows a flowchart that illustrates a method in a receiver according to one embodiment.

FIG. 5 shows an example that can be used in a receiver device that is receiving content distributed by a transmitter such as the transmitter shown in FIG. 2A. In operation 251, the receiver device can detect a first set of packets that are part of a first probing sequence, based upon markers in the packets in the first probing sequence. The first set of packets were sent based upon a target first probing sequence frequency from a transmitter, such as the transmitter shown in FIG. 2A. Then in operation 253, the receiving device can respond to the transmitter with a first estimation of the network bandwidth. This estimation can include a standard deviation and one or more other measures indicating the network bandwidth. In operation 255, the receiving device can detect a second set of packets that are part of a second probing sequence which was sent based on a target second probing sequence frequency which is different than the first probing sequence frequency. Then in operation 257, the client device can respond to the transmitter with a second estimation of network bandwidth. The client device or receiver can revert back to operation 251, and thus the process can repeat over time by the receiver to provide feedback to the transmitter wherein the feedback is based on the dynamic probing frequency.

BWE Stability to Probing Policy Mapping

The following section describes a particular embodiment that uses bandwidth estimation stability values to control a method in this particular embodiment, and a specific example is described for a probing policy and the mapping between the probing policy and the bandwidth estimation stability values. The particular embodiment is described for purposes of non-limiting illustration and other embodiments may use different policies and different mappings and may even use other measures of network bandwidth as an input to select the different policies in the different mappings.

Bandwidth estimation stability (BWE stability) is a measurement of how much deviation the BWE results are to their moving average. However, to consider the case of sudden bandwidth change, which would naturally lead to a large deviation for some time, the following three states can be used in this particular embodiment bandwidth estimation. {BWE_STATE_INITIAL, BWE_STATE_STABLE, BWE_STATE_SUDDEN_BANDWIDTH_CHANGE}

BWE State Transition:

1. A method using these three states can start at BWE_STATE_INITIAL for a given time window, and start collecting BWE samples. Within the initial time window, e.g. 4 seconds window, the initial BWE value can be calculated by averaging all the BWE samples collected within the initial time window:

Initial_BWE_value=sum(all BWE_sample)/number_BWE_samples

And we get the initial BWE deviation by averaging all the deviations of each samples from the average:
Initial_BWE_deviation=sum(all BWE_deviation)/number_BWE_samples, where BWE_deviation=abs(BWE_sample−initial_BWE_value)

At the end of this initial time window, the method moves the state to

BWE_STATE_SUDDEN_BANDWIDTH_CHANGE, if the initial_BWE_deviation is >0.1*initial_BWE_value Otherwise, the method moves the state to BWE_STATE_STABLE 2. If the state is BWE_STATE_STABLE, the method can continuously measure the BWE value and BWE deviation with each sample by using exponential moving average:

BWE_value=(1−alpha)*BWE_value+alpha*new_BWE_sample

BWE_deviation=(1−beta)*BWE_deviation+beta*new_BWE_deviation, where the new_BWE_deviation=abs(new_BWE_sample−BWE_value)

The method moves the state to BWE_SATE_SUDDEN_BANDWIDTH_CHANGE when new_BWE_deviation>0.25*BWE_value. Otherwise, the method stays at BWE_STATE_STABLE.

3. When the state transits to BWE_STATE_SUDDEN_BANDWIDTH_CHANGE, the method can start doing sudden bandwidth change evaluation. In additional to measuring the BWE_value and BWE_deviation like in the state BWE_STATE_STABLE, the method calculates a second track of average BWE value and average BWE deviation during sudden bandwidth change evaluation. The evaluation would take at least 10 BWE samples or whatever number of samples we collected in the next 4 seconds. These BWE samples collected during sudden bandwidth change evaluation are referred to as: BWE_sample_sudden_change.

The two additional metrics are also used:

avg_BWE_value_sudden_change=sum(all BWE_sample_sudden_change)/number_BWE_sample_sudden_change avg_BWE_deviation_sudden_change=sum(all BWE_deviation_sudden_change)/number_BWE_ sample_sudden_change, where BWE_deviation_sudden_change=abs(BWE_sample_ sudden_change−avg_BWE_value_sudden_change)

After the 10th samples, or 4 seconds with less number of samples, the method moves the state back to BWE_STATE_STABLE, if avg_BWE_deviation_sudden_change<=0.1*avg_BWE_value_sudden_change. And update BWE_value=avg_BWE_value_sudden_change. Otherwise, the method keeps the state in BWE_STATE_ SUDDEN_BANDWIDTH_CHANGE, and continue doing the sudden bandwidth change evaluation with each new BWE sample by calculating these two additional metrics.

BWE Stability Mapping

In this method the BWE stability is defined in 16 levels. The 16 levels are mapped based on the following:

| Level | State | Deviation thresholds (tunable) |
| --- | --- | --- |
| BWE_STABILITY_LEVEL_0 | BWE_STATE_STABLE | BWE_deviation/BWE_value = [0, 0.05) |
| BWE_STABILITY_LEVEL_1 | BWE_STATE_STABLE | BWE_deviation/BWE_value = [0.05, 0.1) |
| BWE_STABILITY_LEVEL_2 | BWE_STATE_STABLE | BWE_deviation/BWE_value = [0.1, 0.15) |
| BWE_STABILITY_LEVEL_3 | BWE_STATE_STABLE | BWE_deviation/BWE_value = [0.15, 0.2) |
| BWE_STABILITY_LEVEL_4 | BWE_STATE_STABLE | BWE_deviation/BWE_value = [0.2, 0.25) |
| BWE_STABILITY_LEVEL_5 | BWE_STATE_STABLE | BWE_deviation/BWE_value = [0.25, 0.3) |
| BWE_STABILITY_LEVEL_6 | BWE_STATE_STABLE | BWE_deviation/BWE_value = [0.3, 0.5) |
| BWE_STABILITY_LEVEL_7 | BWE_STATE_STABLE | BWE_deviation/BWE_value = [0.5, 1) |
| BWE_STABILITY_LEVEL_8 | BWE_STATE_SUDDEN_BANDWIDTH_CHANGE | Avg_BWE_deviation_sudden_change/avg_BWE_value_sudden_change = [0, 0.1) |
| BWE_STABILITY_LEVEL_9 | BWE_STATE_SUDDEN_BANDWIDTH_CHANGE | Avg_BWE_deviation_sudden_change/avg_BWE_value_sudden_change = [0.1, 0.15) |

-continued

| Level | State | Deviation thresholds (tunable) |
|---|---|---|
| BWE_STABILITY_LEVEL_10 | BWE_STATE_SUDDEN_BANDWIDTH_CHANGE | Avg_BWE_deviation_sudden_change/ avg_BWE_value_sudden_change = [0.15, 0.2) |
| BWE_STABILITY_LEVEL_11 | BWE_STATE_SUDDEN_BANDWIDTH_CHANGE | Avg_BWE_deviation_sudden_change/ avg_BWE_value_sudden_change = [0.2, 0.25) |
| BWE_STABILITY_LEVEL_12 | BWE_STATE_SUDDEN_BANDWIDTH_CHANGE | Avg_BWE_deviation_sudden_change/ avg_BWE_value_sudden_change = [0.25, 0.3) |
| BWE_STABILITY_LEVEL_13 | BWE_STATE_SUDDEN_BANDWIDTH_CHANGE | Avg_BWE_deviation_sudden_change/ avg_BWE_value_sudden_change = [0.3, 0.4) |
| BWE_STABILITY_LEVEL_14 | BWE_STATE_SUDDEN_BANDWIDTH_CHANGE | Avg_BWE_deviation_sudden_change/ avg_BWE_value_sudden_change = [0.4, 0.5) |
| BWE_STABILITY_LEVEL_15 | BWE_STATE_SUDDEN_BANDWIDTH_CHANGE | Avg_BWE_deviation_sudden_change/ avg_BWE_value_sudden_change = [0.5, 1) |

BWE Feedback

The receiver doing the BWE will periodically get the most recent BWE_value and the BWE_stability, and feed these metrics back to the sender. Since the feedback can be sent with audio packets from the receiver (piggybacked on the reverse path audio packets), the sender is able to get very frequent feedback at every 20/40/60 ms depending on the audio bundling factor.

Probing Policy Mapping

Sender receives these periodic feedback continuously, and the sender (transmitter) can do the following probing policy mapping to obtain the probing parameter set: {Max-Probe-Spacing-Time, Target-Probe-Spacing-Time, Min-Probe-Size, Min-Number-of-Probing-Packets}

This method adopts the following rules in the probing policy:

1. If the BWE_value is 0, or the BWE_stability is BWE_STABILITY_LEVEL_8, keep using the existing policy.
2. Given the BWE_stability value, the method selects the parameter sets with the following rules: For BWE_stability<BWE_STABILITY_LEVEL_8, the method selects the parameter sets that has the following Target-Probe-Spacing-Time and Max-Probe-Spacing-Time:

| Set No = (5*a + b) | Target-Probe-Spacing-Time (ms) | Max-Probe-Spacing-Time (ms) | BWE_stability |
|---|---|---|---|
| a = 0 | 33 | 2000 | BWE_STABILITY_LEVEL_0 |
| a = 1 | 66 | 2000 | BWE_STABILITY_LEVEL_1 |
| a = 2 | 132 | 2000 | BWE_STABILITY_LEVEL_2 |
| a = 3 | 264 | 2000 | BWE_STABILITY_LEVEL_3 |
| a = 4 | 333 | 2000 | BWE_STABILITY_LEVEL_4 |
| a = 5 | 666 | 2000 | BWE_STABILITY_LEVEL_5, BWE_STABILITY_LEVEL_6 |
| a = 6 | 999 | 2000 | BWE_STABILITY_LEVEL_7 |

For BWE_stability>BWE_STABILITY_LEVEL_8, the method would only change the policy if the previous policy has already been selected for at least 4 seconds.

Then, the method would select the policy sets that has the next larger Target-Probe-Spacing-Time if BWE_stability level increases. And select the policy sets that has the next smaller Target-Probe-Spacing-Time if BWE_stability level decreases. If the BWE_stability level remains, the method selects the parameter sets that has the same Target-Probe-Spacing-Time.

Finally, based on the BWE_value, the method selects one parameter set from the filtered parameter sets with the following Min-Probe-Size and Min-Number-of-Probing-Packets.

| Set No = (5*a + b) | Min-Probe-Size (bytes) | Min-Number-of-Probing-Packets | BWE_value thresholds (tunable) |
|---|---|---|---|
| b = 0 | 2750 | 4 | BWE_value = [1100, 65535] |
| b = 1 | 1750 | 4 | BWE_value = [700, 1100] |
| b = 2 | 500 | 3 | BWE_value = [200, 700] |
| b = 3 | 275 | 2 | BWE_value = [110, 200] |
| b = 4 | 250 | 2 | BWE_value = [0, 110] |

Figure 6:
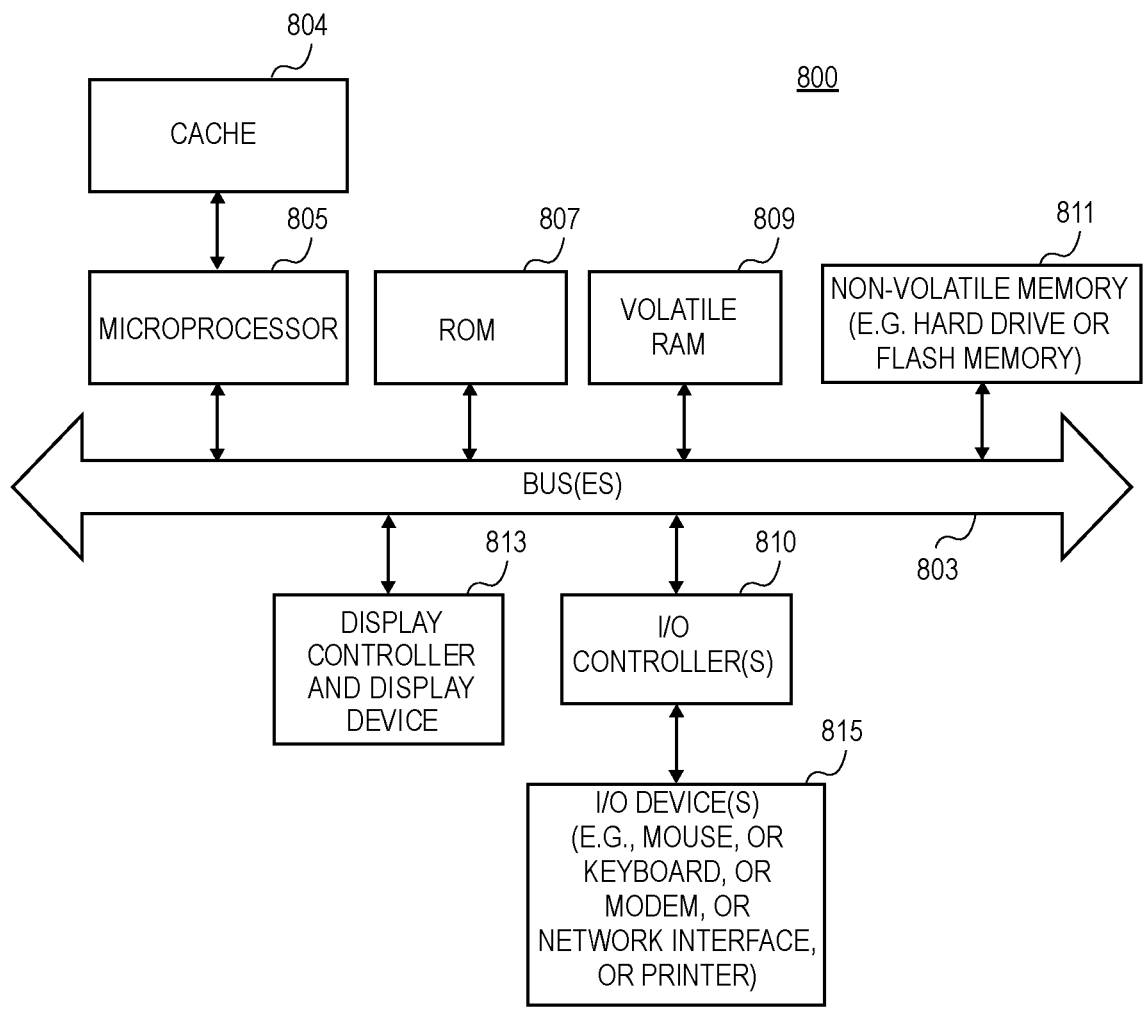
FIG. 6 shows an example of an embodiment of a data processing system that can be used as a transmitter or a receiver in one or more implementations described herein.

FIG. 6 shows one example of a data processing system 800, which may be used with one embodiment. For example, the system 800 may be implemented to provide a transmitter system or device shown in FIG. 2A or a transmitter that performs the methods of FIG. 3A, 3B or 4 or a receiver that performs the method shown in FIG. 5. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a device containing a processing system cause the device to perform a method in the device that is transmitting data through one or more networks to one or more receivers, the method comprising:

packetizing content to be transmitted to the one or more receivers;

when a lapsed time since a most recent probing sequence was transmitted to the one or more receivers exceeds a predetermined time:

determining whether the packetized content awaiting transmission has a sufficient size for use as a probing sequence, when the packetized content awaiting transmission has an insufficient size for use as a probing sequence, creating additional content to add to the packetized content to ensure the packetized content has the sufficient size, wherein the additional content comprises an error correction code and wherein the predetermined time is a maximum probe spacing time, and transmitting the packetized content.

2. The medium as in claim 1, wherein the determining comprises:

monitoring whether content to be transmitted provides an adequate probing sequence for use in estimations that represent network bandwidth.

3. The medium as in claim 2, wherein the monitoring compares the content to parameters that include a minimum probe size and a minimum number of packets for a probing sequence.

4. The medium as in claim 2, wherein the monitoring causes a probing sequence to be sent based on a target probe spacing time.

5. The medium as in claim 1, wherein the transmitting transmits the content and the additional added content as part of a probing sequence.

6. The medium as in claim 5, wherein the probing sequence includes a marker indicating packets in the one or more first probing sequences are part of a same probing sequence to cause a receiver to estimate and report bandwidth estimation.

7. The medium as in claim 6, wherein the probing sequence is created by packetizing content into the packets and adding the marker and one or more headers, and wherein the content is displayed at the receiver.

8. The medium as in claim 7, wherein the content is used as part of the probing sequences, and wherein the first probing sequence frequency is associated with a first target spacing time and a first target probing sequence length and the second probing sequence frequency is associated with a second target spacing time and a second target probing sequence length.

9. The medium as in claim 8, wherein the first probing sequence frequency is a high frequency, relative to the second probing sequence frequency, and wherein the first probing sequence frequency is greater than 10 probing sequences per second.

10. A method in the device that is transmitting data through one or more networks to one or more receivers, the method comprising:

packetizing content to be transmitted to the one or more receivers;

when a lapsed time since a most recent probing sequence was transmitted to the one or more receivers exceeds a predetermined time:

determining whether the packetized content awaiting transmission has a sufficient size for use as a probing sequence, when the packetized content awaiting transmission has an insufficient size for use as a probing sequence, creating additional content to add to the packetized content to ensure the packetized content has the sufficient size, wherein the additional content comprises an error correction code and wherein the predetermined time is a maximum probe spacing time, and transmitting the packetized content.

11. The method as in claim 10, wherein the determining comprises:

monitoring whether content to be transmitted provides an adequate probing sequence for use in estimations that represent network bandwidth.

12. The method as in claim 11, wherein the monitoring compares the content to parameters that include a minimum probe size and a minimum number of packets for a probing sequence.

13. The method as in claim 11, wherein the monitoring causes a probing sequence to be sent based on a target probe spacing time.

14. The method as in claim 10, wherein the transmitting transmits the content and the additional added content as part of a probing sequence.

15. The method as in claim 14, wherein the probing sequence includes a marker indicating packets in the one or more first probing sequences are part of a same probing sequence to cause a receiver to estimate and report bandwidth estimation.

16. The method as in claim 15, wherein the probing sequence is created by packetizing content into the packets and adding the marker and one or more headers, and wherein the content is displayed at the receiver.

17. The method as in claim 16, wherein the content is used as part of the probing sequences, and wherein the first probing sequence frequency is associated with a first target spacing time and a first target probing sequence length and the second probing sequence frequency is associated with a second target spacing time and a second target probing sequence length.

18. The method as in claim 17, wherein the first probing sequence frequency is a high frequency, relative to the second probing sequence frequency, and wherein the first probing sequence frequency is greater than 10 probing sequences per second.

19. A non-transitory machine readable medium storing executable program instructions which when executed by a device containing a processing system cause the device to perform a method in the device that is transmitting data through one or more networks to one or more receivers, the method comprising:

packetizing content to be transmitted to the one or more receivers;

when a lapsed time since a most recent probing sequence was transmitted to the one or more receivers exceeds a predetermined time:

determining whether the packetized content awaiting transmission has a sufficient size for use as a probing sequence, when the estimated amount of available packetized content has the sufficient size, transmitting available packetized content in a new probing sequence, and when the estimated amount of available packetized content has an insufficient size for use as the probing sequence:
creating additional content to add to the available packetized content, and
transmitting available packetized content and the created additional content in the new probing sequence.

20. The medium of claim 19, wherein the additional content comprises an error correction code and wherein the predetermined time is a maximum probe spacing time.

21. The medium of claim 19, wherein the lapsed time exceeds the predetermined time.

22. The medium of claim 19, wherein the lapsed time is based on a refresh rate of the content.

* * * * *